Figure 1:
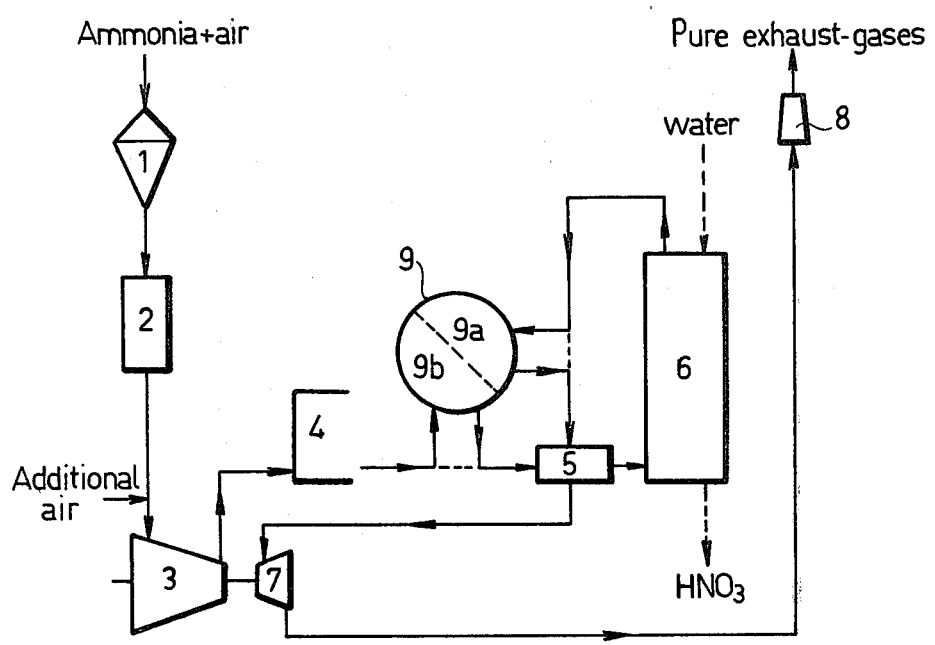

United States Patent [19]

Klopp et al.

[11] 4,367,204
[45] Jan. 4, 1983

[54] PROCESS FOR THE RECIRCULATION OF NITROGEN OXIDES

[75] Inventors: Gábor Klopp; József Sütő; Károly Szász; Imre Szebényi; Gábor Winkler; Miklós Machács; György Pálmai, all of Budapest, Hungary

[73] Assignee: Budapesti Müszaki Egyetem, Budapest, Hungary

[21] Appl. No.: 254,776

[22] Filed: Apr. 16, 1981

Related U.S. Application Data

[63] Continuation of Ser. No. 35,948, May 4, 1979, abandoned.

[51] Int. Cl.³ .................................. B01A 53/34
[52] U.S. Cl. .......................... 423/239; 423/393; 423/400
[58] Field of Search .............. 423/239, 393, 400; 55/68, 75

[56] References Cited

U.S. PATENT DOCUMENTS

| | | | |
|---|---|---|---|
| 2,674,338 | 4/1954 | Lindsay et al. | 423/239 |
| 3,389,961 | 6/1968 | Sundaresan et al. | 423/239 |
| 3,473,893 | 10/1969 | Hardison | 423/392 |
| 3,674,429 | 7/1972 | Collins | 423/239 |

FOREIGN PATENT DOCUMENTS

163026 12/1920 United Kingdom .............. 423/400

OTHER PUBLICATIONS

Olsen, Unit Processes and Principles of Chemical Engineering, Van Nostrand Company, N.Y., 1932, pp. 2-3.

Primary Examiner—Earl C. Thomas
Attorney, Agent, or Firm—Gabriel P. Katona

[57] ABSTRACT

The invention is regeneration and recirculation of nitrogen oxides in the exhaust gas of a nitric acid plant without using any material current and heat energy other than that generated in the process of producing nitric acid. Nitrogen oxide is recovered by at least two adsorbers each containing an acid resistant zeolite molecular sieve and operating in an alternate heat cycle; adsorption occurring at 20–40 degrees C. and regeneration at 300–350 degrees C. The hot gas exiting from the oxidation unit used in the production of nitric acid is used to regenerate the adsorbers and the nitrogen oxides set free during the said regeneration are introduced into the main feed stream of the nitric acid plant. In the final stage of the regeneration the adsorbers are cooled by rinsing them with exhaust gas or air at a temperature of 20–40 degrees C.

2 Claims, 2 Drawing Figures

PROCESS FOR THE RECIRCULATION OF NITROGEN OXIDES

This is a continuation of Ser. No. 35,948, filed on May 4, 1979, and now abandoned.

The present invention relates to a process for recirculation of nitrogen oxides in nitric acid plants. A new scheme is disclosed, which is suitable for diminishing the nitrogen oxide content of the exhaust-gases in nitric acid plants by adsorption, for recirculation of the bound nitrogen oxides and utilization thereof.

During industrial work besides dust and sulfur dioxide the most dangerous gases causing air-pollution are nitrogen oxides. Nitrogen oxides get into the atmosphere mainly from heating equipments and from motors, but nitric acid plants are also an undesired local source of pollution, where the nitrogen oxide content of the exhaust-gases is present in the range of from about 1000 to 5000 ppm. Nitrogen oxide emission does not only affect adversely the immediate vicinity of the plants, but causes a significant loss in the nitric acid production. In Hungary the nitric acid losses amount to several 10,000 tonnes a year calculated to 100% acid.

Reduction of nitrogen oxide content of the exhaust-gases in nitric acid plants has been attempted to by various methods, such as alkaline absorption or catalytic reduction of nitrogen oxides to nitrogen under addition of methane or ammonia.

Reduction by natural gas has been widely used in industry in order to meet requirements of environment protection, but this method can be considered a temporary stopgap arrangement as it cannot ensure the utilization of nitrogen oxides. That is why the ammonia alternative cannot be a final solution either. In addition to the economic disadvantages the nitrogen oxide content of the exhaust-gases diminished by catalytic reduction is still 200–500 ppm.

The nitrogen oxide content of the exhaust-gases may be utilized by increasing the efficiency of absorbing towers or by reclaiming the nitrogen oxides by an adsorbent. Designers of nitric acid plants work hard on increasing the efficiency of the absorption, but simultaneously new adsorption technologies are more often applied by using molecular sieve adsorbents.

A great advantage of the exhaust-gas purification by using molecular sieve adsorbents is the possibility of achieving a nitrogen oxide level of below 200 ppm in the exhaust-gas. A similarly low pollution level cannot be achieved by improving the efficiency of the absorption if costs are to be acceptable.

Various solutions have been disclosed for the purification of the exhaust-gases in a nitric acid plant by molecular sieve adsorption. These methods often reflect merely results of laboratory experiments and consequently the adsorption units are not economically feasible in nitric acid plants. Another disadvantage of the known processes is, that in addition to the material currents in the nitric acid plant a new material current (mainly air-current) is used to regenerate the exhausted adsorber, which has to be heated to the temperature of the desorption through an external energy source.

The unit of the Purasiv N process (Fornoff, L. L.: AIChe. Symposium Ser. 68, 126, 11 /1972/) uses energy independently of the nitric acid plant, the recovery is carried out by using air heated in a furnace by means of external energy. External energy is also required in the process of the firm Norton too (Kovsky, J. R., Koradia, P. B., Hook, D. S.: Chem. Eng. Progress, 72, 8, 98 /1976/). In Hungarian Patent Specification No. 158,954 (which corresponds to British Pat. No. 1,211,273 in the name of Universal Oil Products) a regeneration process is disclosed similarly using external energy. According to FIG. 3 of U.S. Pat. No. 3,389,961 the molecular sieve adsorption unit is also connected separately from an energy point of view.

Though the methods described hereinabove are suitable for carrying out the purification of exhaust-gases, as the equipment does not fit in from an energy point of view to the nitric acid plants, they require an additional energy source. Recovery is carried out in most cases with air and a total recirculation of the obtained nitrogen oxides cannot generally be achieved. Part of the nitrogen oxides is converted to nitric acid in a separate unit (for example U.S. Pat. No. 3,389,961, Norton process) and thus due to two different products additional equipment is required.

In order to eliminate the above mentioned disadvantages we have developed an adsorption unit which can be integrated in a nitric acid plant both as to energy requirements and material currents. It is able to recirculate the total amount of the recovered nitrogen oxides and can regenerate the adsorbent without any external energy source by utilizing the energy obtained during the oxidation of nitrogen monoxide to nitrogen dioxide.

We have found that by using suitable heat- and acid resistant adsorbents, desorption may be carried out by passing the hot gas mixture leaving the oxidation unit directly through the adsorber. This finding is surprising as the gases leaving the oxidation unit contain 7 to 13% by Vol. nitrogen oxide and this gas mixture of high nitrogen dioxide content is unexpectedly able to remove the adsorbed nitrogen oxides from the adsorber.

We have further found that the exhaust-gases need not be dried prior to the adsorption. The exhaust-gas leaving the absorber and being saturated with vapour at a given temperature may be led directly to the adsorber. This finding is also surprising as the used adsorbents generally show a good water-binding ability and thus in the known processes the exhaust-gases to be purified were previously dried (for example Purasiv N). Not only is a previous drying not needed but during regeneration the adsorbers are rinsed and cooled with the exhaust-gas and nevertheless the adsorbent has an unexpected nitrogen oxide binding capacity.

According to the invention a process is provided for diminishing the nitrogen oxide content of the exhaust-gases in a nitric acid plant and for recirculation of the nitrogen oxides by using adsorbers working in a heat-alternating cycle. The energy necessary for the desorption of the nitrogen oxides bound on the adsorbent is gotten from the heat which is obtained during the oxidation of nitrogen monoxide. After the adsorption the hot gas leaving the oxidation unit or a part thereof is passed through the adsorber and the gas leaving the adsorber is recirculated to the main material current of the nitric acid plant under heating. While holding this temperature and after desorption, the adsorber is rinsed with exhaust-gas or air and the rinsing gas is led to the main material current of the plant, and finally the adsorber is cooled with exhaust-gas.

The above invention will become more apparent from the following description of the accompanying drawings, which illustrate the preferred embodiments:

FIG. 1 diagrammatically represents in accordance with the invention the system of regenerating and recirculating nitrogen oxides from the exhaust gases in a nitric acid plant.

FIGS. 2A, B, C and D are schematic diagrams of the adsorbing unit containing two adsorbers in the time sequence of the steps of the temperature alternating adsorption cycle.

The main material currents and the scheme of the exhaust-gas purification adsorption unit attached to the currents according to the invention are illustrated by FIG. 1 showing a simplified process scheme of nitric acid plants.

In FIG. 1 the numeral 1 signifies a converter wherein ammonia is burned with air. Numeral 2 indicates a cooling unit which is connected to a turbo-compressor 3, which in turn is connected to oxidation unit 4. Heat exchanger 5 is connected to absorber 6 which connects with adsorbers, 9a and 9b which can be operated independently of each other.

Ammonia is burnt with the admixed air to give nitrogen monoxide in converter 1 followed by cooling gases of 800° to 850° C. to 100° to 150° C. in cooler 2 and the gas is led to oxidation unit 4 by turbo-compressor 3 under addition of additional air. In oxidation unit 4 the nitrogen monoxide is converted to nitrogen dioxide. Hot gases of 300° to 350° C. leaving unit 4 are led through heat exchanger 5 to absorber column 6, where the gases are converted to nitric acid with water, and the exhaust-gases of 20° to 40° C. get to the open air through energy utilizing unit 7 and chimney-stack 8. Exhaust-gas purifying unit 9 is connected with the material current of the nitric acid plant according to FIG. 1.

Exhaust-gas purifying unit 9 contains at least two adsorption columns. The condition of the application of two columns is regeneration during a shorter time than the time necessary to the saturation of the adsorber in the adsorption period. As shown in in FIG. 1 the exhaust-gas to be purified is passed through adsorber 9a and the hot nitrogen oxide containing gas is led through adsorber 9b, where adsorption takes place in the first column and desorption in the second column. After desorption is completed the nitrogen oxide containing gas is removed from adsorber column 9b by rinsing.

Rinsing may be carried out with the exhaust-gas being present in the plant or with a part-current of the necessary additional air, the rinsing gas is led to the main gas current of the plant getting to the absorber column through the sucking side of the turbo-compressor. After rinsing the column is cooled to the temperature of the adsorption, and this may be carried out on industrial scale by oversuction of the cold gas.

The purified exhaust-gas current is preferably used for cooling. When cooling is ended the regenerated adsorber 9b works until the exhaustion of adsorber 9a.

Figure 2:
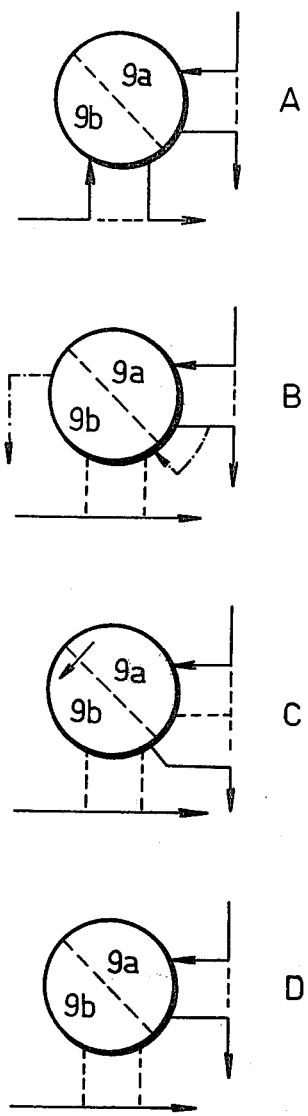

When using two columns one may preferably proceed as follows: while passing through adsorber 9a exhaust-gases leaving absorber 6, the other adsorber 9b is regenerated by leading the hot gas leaving oxidation unit 4 through adsorber 9b and the desorbed gas containing nitrogen oxides leaving adsorber 9h is led to absorber 6. When desorption of adsorber 9b is completed, it is rinsed with purified exhaust gas from adsorber 9a and the rinsing gas is then led from adsorber 9b to the main material current of the nitric acid plant as shown in FIG. 2, section B. This step is followed by cooling adsorber 9b to the temperature of adsorption with the purified gas leaving adsorber 9a working in the adsorption cycle. Finally when adsorber 9a is exhausted, the exhaust-gas current to be purified is switched to the regenerated adsorber 9b and adsorber 9a which was exhausted in the previous cycle, is regenerated in like manner. This working scheme is illustrated by FIG. 2 sections A-D of which show the elementary steps of the temperature alternating adsorption cycle in which, in order of time, adsorber 9a is in the adsorption period of the cycle and adsorber 9b is in the regenerated period:

|   | in adsorber 9a | in adsorber 9b |
|---|---|---|
| A | adsorption | desorption |
| B | adsorption | rinsing |
| C | adsorption | cooling |
| D | adsorption | — |

(Desorption includes heating up and holding the temperature as well.)

Nitrogen oxides may be recirculated by using three or more columns as well, the number of the adsorbers being determined on the base of economy and plant security points of view. The size of the individual columns may be reduced by increasing number of columns, but the number of fittings and pipes, however, increases.

Pressure in the exhaust-gas purifying system is the same as the pressure of the main current of the nitric acid plant. As heat- and acid resistant adsorbent suitably pretreated natural zeolite-minerals, such as mordenite or clinoptilolite type molecular sieves may be used.

The heating up and holding the temperature of the column is preferably carried out countercurrent to the gas flow under adsorption, whereas the direction of the gas flow during rinsing and cooling is cocurrent to the adsorption current.

The process according to the invention may preferably be used for the purification of the exhaust-gases of any nitric acid plant. The energy requirement for the recovery of the adsorbers is ensured by the heat of oxidation of nitrogen monoxide. A separate furnace which heats up the air, heat exchangers, and the accompanying fittings and instruments are thus eliminated. As rinsing may be carried out with a part current of the present crude exhaust-gas or exhaust-gas purified by adsorption or with a part-current of the additional air sucked in each case and as cooling may be carried out by passing the purified exhaust-gas through the column to be regenerated, no new material current and not even machines moving the same are needed.

Cooling according to the above method is accompanied by further advantages: the heat energy accumulated in the adsorber may be used for heating the exhaust-gas, and if desired the capacity of the just working adsorption column may be utilized not only until breakthrough but until total saturation as well.

The process of the invention is further illustrated the following Examples.

EXAMPLE 1

A cylindric adsorber (length: 1.2 m; diameter: 216 mm) prepared from acid-resistant steel was provided with heat insulation and on the packing-keeping plates of the adsorber, an acid resistant adsorbent suitable for nitrogen oxide adsorption having an acid-treated clinoptilolite mineral as active ingredient in an amount of 30.6 kg. was placed to a height of 1 m. In a nitric acid plant working with heat-insulated pipe the column was fitted to a place indicated in FIG. 1 at 9b and it was heated up to 320° to 330° C. within 1 hour with the product of the oxidation unit having a temperature of 340° C., and a pressure of 2.5 att rising upwardly. The temperature of the column was followed by iron-constantan (iron-konstantin) thermocouples placed to suitable sleeves. The column was kept at 320°–330° C. for 1 hour, followed by rinsing with exhaust-gas and cooling in counter-current.

0.3% by Vol. nitrogen-oxide containing exhaust-gas was then passed through the column downwardly at a flow rate of 30 m$^3$/h. The leaving gas was analysed by NO resp. NO$_2$ analyser (HARTMAN-BRAUN) (West Germany). Analysis showed that the thus prepared column kept the nitrogen oxide content of the exhaust-gas passed through the column below 200 ppm. for 2.5 hours. The test was repeated several times. The column showed a steady output when measured subsequently.

EXAMPLE 2

To the adsorption column according to Example 1, 25.8 kg. of mordenite-based acid-resistant adsorbent was placed in a 1 m. layer. This adsorbent filling ws heat-treated as described in Example 1 with the gas obtained as a product of the oxidation unit followed by rinsing and cooling with the exhaust-gas in countercurrent. Through the column 40 m$^3$/h 0.2% by Vol. nitrogen-oxide containing gas was passed downwardly. According to the analyser the nitrogen oxide content of the passed exhaust-gas exceeded 200 ppm limit only after 5.3 hours. The test was repeated several times and the absorbent showed a steady rate of adsorption.

What we claim is:

1. A process for reduction of the nitrogen oxide content of exhaust gases produced in the manufacture of nitric acid using at least two absorbers containing heat- and acid-resistant adsorbent consisting of a zeolite molecular sieve of the class consisting of mordenite and clinoptilolite in a heat alternating cycle where a first adsorber is in an adsorbing condition and a second adsorber is to be regenerated, wherein a stream of nitrogen monoxide is oxidized in an exothermic reaction with oxygen to form a hot nitrogen dioxide gas stream, consisting of the following sequential steps, (1) leading directly after the above oxidation said hot nitrogen dioxide gas through said second adsorber at a temperature of 300–350 degrees C. to regenerate it, (2) cooling the nitrogen dioxide gas exiting from the said regenerated adsorber, (3) converting some of the contained nitrogen dioxide with water to nitric acid to create an impure exhaust gas, (4) absorbing the nitrogen oxide content of said impure exhaust gas in said first adsorber to form purified exhaust gas at a temperature of 20–40 degrees C., (5) scavenging said second adsorber with a part of said purified exhaust gas, (6) recycling said part of purified exhaust gas into the aforesaid hot nitrogen dioxide gas stream before said cooling, (7) removing exhaust gas and replacing the exhausted first adsorber by the regenerated second adsorber.

2. A method as in claim 1 wherein the second adsorber is cooled with purified exhaust gas after its regeneration.

* * * * *